US006727289B2

(12) United States Patent
Ionkina et al.

(10) Patent No.: US 6,727,289 B2
(45) Date of Patent: Apr. 27, 2004

(54) BORON PROMOTED CATALYSTS AND FISCHER-TROPSCH PROCESSES

(75) Inventors: Olga Ionkina, Ponca City, OK (US); Wenchun Chao, State College, PA (US); Munirpallam A. Subramanian, Kennett Square, PA (US); Leo E. Manzer, Wilmington, DE (US); Kamel M. Makar, Wilmington, DE (US); Ajoy P. Raje, Stillwater, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/047,231

(22) Filed: Jan. 14, 2002

(65) Prior Publication Data

US 2002/0173555 A1 Nov. 21, 2002

Related U.S. Application Data

(60) Provisional application No. 60/261,298, filed on Jan. 12, 2001, and provisional application No. 60/262,336, filed on Jan. 17, 2001.

(51) Int. Cl.$^7$ ............................................. C07C 27/00
(52) U.S. Cl. ....................................... 518/715; 518/721
(58) Field of Search ................................ 518/715, 721

(56) References Cited

U.S. PATENT DOCUMENTS

| | | | | |
|---|---|---|---|---|
| 4,088,671 A | * | 5/1978 | Kobylinski | 260/449.6 R |
| 4,415,675 A | | 11/1983 | Tsang et al. | 518/715 |
| 4,568,698 A | | 2/1986 | Desmond et al. | 518/713 |
| 4,654,458 A | | 3/1987 | Jezl et al. | 585/500 |
| 4,661,525 A | | 4/1987 | Grazioso et al. | 518/714 |
| 4,778,826 A | | 10/1988 | Jezl et al. | 518/703 |
| 4,863,888 A | | 9/1989 | Melville et al. | 502/207 |
| 4,906,671 A | | 3/1990 | Haag et al. | 518/713 |
| 4,945,116 A | | 7/1990 | Abrevaya | 518/715 |
| 5,059,574 A | | 10/1991 | Abrevaya | 502/261 |
| 5,084,259 A | | 1/1992 | Satek et al. | 423/277 |
| 5,116,879 A | * | 5/1992 | Eri et al. | 518/716 |
| 5,380,933 A | | 1/1995 | Ushikubo et al. | 562/549 |
| 5,449,821 A | | 9/1995 | Neumann et al. | 562/546 |
| 5,789,490 A | | 8/1998 | Chang | 525/403 |
| 5,817,593 A | | 10/1998 | Chang et al. | 502/207 |
| 5,952,529 A | | 9/1999 | Chang et al. | 564/480 |
| 6,140,460 A | | 10/2000 | Dossett | 528/392 |
| 6,149,799 A | | 11/2000 | Raybaud et al. | 208/49 |
| 6,239,184 B1 | | 5/2001 | Beer et al. | 518/709 |

FOREIGN PATENT DOCUMENTS

| | | | | |
|---|---|---|---|---|
| EP | 0 208 102 | 5/1986 | | C07C/29/15 |
| WO | WO 99/61144 | 12/1999 | | |
| WO | 00/10698 | 2/2000 | | |
| WO | 00/10704 | 2/2000 | | B01J/21/08 |
| WO | 00/10705 | 2/2000 | | B01J/21/08 |
| WO | 00/16901 | 3/2000 | | B01J/23/83 |
| WO | WO 01/36352 | 5/2001 | | |

OTHER PUBLICATIONS

M.J. Philips et al, Proceedings 9th International Congress on Catalysis, vol. 2, 1988.*
Zhang, Yu, et al; *Studies on the Chemisorption of CO, H2 and their Interaction on Amorphous*; Chemical Journal of Chinese Universities; vol. 17, No. 1, (1997) ; (pp. 131–133).
Li, Jinlin, et al; *Effect of Boron and Ruthenium on the Catalytic Properties of CO/TiO$_2$ Fischer–Tropsch Catalysts;* Preprints Symposia; Division of Petroleum Chemistry, In c.; vol. 45, No. 2, Mar. 2000; (pp. 253–255).
Bromfield, Tracy C., et al; *The Effect of Sulfide Ions on a Precipitated Iron Fischer–Tropsch Catalysts*; Applied Catalysis A: General 186 (1999) (pp. 297–307).
Chen, Yin–Zu, et al; *Chemisorptive and Catalytic Properties of Cobalt Boride Catalysts Co Hydrogenation*; Journal of The Chin., 1. Ch. E., vol. 23, No. 2, 1992; (pp. 119–126).
Zhang, Ju, et al; *Study on the Thermal Stability of Amorphous Ni(Co)–B Alloys and their Catalysts;* Journal of Molecular Catalysis (China), vol. 9, No. 2, Apr. 1995 (pp. 152–156).
Yao, Kai–wen, et al; *Studies on the Ultrafine Amorphous Co–B Alloy Particle Catalysts*; Chinese Journal of Catalysis; vol. 16, No. 4, Jul. 1995; (pp. 253–254).
Li, Jinlin, et al; *The Effect of Boron on the Catalyst Reducibility and Activity of Co/TiO$_2$ Fischer–Tropsch Catalysts*; Applied Catalysis A: General 181 (1999) (pp. 201–208).
Pavlenko, N. V., et al; *Influence of the Nature of the Modifying Cation on the Activity and Selectivity of Co/S10$_2$ Catalysis of Hydrocarbon Synthesis From Co and H$_2$;* Theoretical and Experimental Chemistry; vol. 28, No. 3, May–Jun. 1992; (pp. 163–166).
Database WPI; Section Ch, Week 198546, Derwent Publications Ltd., London, GB; Class E17, AN 1985–287058; XP002202158 & JP 60 197238 A (JGC Corp.), Oct. 5, 1985 Abstract; (1 p.).
PCT International Search Report for Appln. No. PCT/US02/04681, dated Jul. 8, 2002 (pp.5).

* cited by examiner

*Primary Examiner*—J. Parsa
(74) *Attorney, Agent, or Firm*—Conley Rose, P.C.

(57) ABSTRACT

A process is disclosed for producing hydrocarbons. The process involves contacting a feed stream comprising hydrogen and carbon monoxide with a catalyst in a reaction zone maintained at conversion-promoting conditions effective to produce an effluent stream comprising hydrocarbons. In accordance with this invention, the catalyst used in the process includes at least a Fischer-Tropsch metal and boron. The Fischer-Tropsch metal preferably includes cobalt and optionally ruthenium or platinum. The catalyst may also comprise a support material selected from the group including silica, titania, titania/alumina, zirconia, alumina, aluminum fluoride, and fluorided aluminas.

11 Claims, No Drawings

BORON PROMOTED CATALYSTS AND FISCHER-TROPSCH PROCESSES

CROSS-REFERENCE TO RELATED APPLICATIONS

This application claims the benefit under 35 U.S.C. §119 (e) of U.S. Provisional Patent Application No. 60/261,298, filed Jan. 12, 2001, and U.S. Provisional Application No. 60/262,336, filed Jan. 17, 2001, each hereby incorporated herein by reference.

STATEMENT REGARDING FEDERALLY SPONSORED RESEARCH OR DEVELOPMENT

Not applicable.

FIELD OF THE INVENTION

The present invention relates to a process for the preparation of hydrocarbons from synthesis gas, (i.e., a mixture of carbon monoxide and hydrogen), typically labeled the Fischer-Tropsch process. Particularly, this invention relates to the use of supported catalysts containing boron and a Fischer-Tropsch catalytic metal (such as cobalt, cobalt/ruthenium, and the like) for the Fischer-Tropsch process.

BACKGROUND OF THE INVENTION

Large quantities of methane, the main component of natural gas, are available in many areas of the world. Methane can be used as a starting material for the production of hydrocarbons. The conversion of methane to hydrocarbons is typically carried out in two steps. In the first step methane is reformed with water or partially oxidized with oxygen to produce carbon monoxide and hydrogen (i.e., synthesis gas or syngas). In a second step, the syngas is converted to hydrocarbons. This second step, the preparation of hydrocarbons from synthesis gas is well known in the art and is usually referred to as Fischer-Tropsch synthesis, the Fischer-Tropsch process, or Fischer-Tropsch reaction(s).

The Fischer-Tropsch reaction involves the catalytic hydrogenation of carbon monoxide to produce a variety of products ranging from methane to higher aliphatic alcohols. The process has been considered for the conversion of carbonaceous feedstock, e.g., coal or natural gas, to higher value liquid fuel or petrochemicals. The methanation reaction was first described in the early 1900's, and the later work by Fischer and Tropsch dealing with higher hydrocarbon synthesis was described in the 1920's. The first major commercial use of the Fischer-Tropsch process was in Germany during the 1930's. More than 10,000 B/D (barrels per day) of products were manufactured with a cobalt based catalyst in a fixed-bed reactor. This work has been described by Fischer and Pichler in Ger. Pat. No. 731,295 issued Aug. 2, 1936, hereby incorporated herein by reference. Commercial practice of the Fischer-Tropsch process has continued from 1954 to the present day in South Africa in the SASOL plants. These plants use iron-based catalysts, and produce gasoline in relatively high-temperature fluid-bed reactors and wax in relatively low-temperature fixed-bed reactors.

The Fischer-Tropsch synthesis reactions are highly exothermic and reaction vessels must be designed for adequate heat exchange capacity. Because the feed streams to Fischer-Tropsch reaction vessels are gases while the product streams include liquids, the reaction vessels must have the ability to continuously produce and remove the desired range of liquid hydrocarbon products. Motivated by production of high-grade gasoline from natural gas, research on the possible use of the fluidized bed for Fischer-Tropsch synthesis was conducted in the United States in the mid-1940s. Based on laboratory results, Hydrocarbon Research, Inc. constructed a dense-phase fluidized bed reactor, the Hydrocol unit, at Carthage, Tex., using powdered iron as the catalyst. Due to disappointing levels of conversion, scale-up problems, and rising natural gas prices, operations at this plant were suspended in 1957. Research has continued, however, on developing Fischer-Tropsch reactors such as slurry-bubble columns, as disclosed in U.S. Pat. No. 5,348,982 issued Sep. 20, 1994, hereby incorporated herein by reference.

Catalysts for use in the Fischer-Tropsch synthesis usually contain a catalytically active metal of Groups 8, 9, 10 (in the New notation of the periodic table of the elements, which is followed throughout). In particular, iron, cobalt, nickel, and ruthenium, and combinations thereof, have been abundantly used as the catalytically active metals. Cobalt and ruthenium have been found to be particularly suitable for catalyzing a process in which synthesis gas is converted to primarily hydrocarbons having five or more carbon atoms (i.e., where the $C_5^+$ selectivity of the catalyst is high). However, due to its expense and rarity, ruthenium is typically used in combination with another of the catalytically active metals, such as cobalt. For example, U.S. Pat. No. 4,088,671, hereby incorporated herein by reference, discloses a process for the synthesis of higher hydrocarbons from the reaction of CO and hydrogen at low pressure in the contact presence of a catalyst comprising as the active ingredients a major amount of cobalt and a minor amount of ruthenium.

Additionally, the catalysts often contain a support or carrier material. Supports for catalysts used in Fischer-Tropsch synthesis of hydrocarbons have typically been refractory oxides (e.g., silica, alumina, titania, zirconia or mixtures thereof, such as silica-alumina). A support may be used to provide a high surface area for contact of the catalytically active metal with the syngas, to reduce the amount of catalytically active metal used, or to otherwise improve the performance or economics of catalysts and catalytic processes.

Additionally, Fischer-Tropsch catalysts often contain one or more promoters. For example, promoters that have been used for cobalt-ruthenium catalysts include thorium, lanthanum, magnesium, manganese, and rhenium. A promoter may have any of various desirable functions, such as improving activity, productivity, selectivity, lifetime, regenerability, or other properties of catalysts and catalytic processes.

There are significant differences in the molecular weight distributions of the hydrocarbon products from Fischer-Tropsch reaction systems. Product distribution or product selectivity depends heavily on the type and structure of the catalysts and on the reactor type and operating conditions. Accordingly, it is highly desirable to maximize the selectivity of the Fischer-Tropsch synthesis to the production of high-value liquid hydrocarbons, such as hydrocarbons with five or more carbon atoms per hydrocarbon chain.

Research is continuing on the development of more efficient Fischer-Tropsch catalyst systems and reaction systems that increase the selectivity for high-value hydrocarbons in the Fischer-Tropsch product stream. High value hydrocarbons include those useful for further processing to yield gasoline, for example $C_{5+}$ hydrocarbons, particularly $C_5$–$C_{10}$ hydrocarbons, and those useful for further processing to yield diesel fuel, for example $C_{11+}$ hydrocarbons are, particularly $C_{11}$–$C_{20}$ hydrocarbons. A number of studies describe the behavior of iron, cobalt or ruthenium based catalysts in various reactor types, together with the development of catalyst compositions and preparations. For example, see the articles "Short history and present trends of Fischer-Tropsch synthesis," by H. Schlutz, Applied Catalysis A 186, 3–12, 1999, and "Status and future opportunities for conversion of synthesis gas to liquid fuels, by G. Alex Mills, Fuel 73, 1243–1279, 1994, each hereby incorporated herein by reference in their entirety.

Notwithstanding the above teachings, it continues to be desirable to improve the activity and reduce the cost of Fischer-Tropsch catalysts and processes. In particular, there is still a great need to identify new promoted catalysts useful for Fischer-Tropsch synthesis, particularly catalysts that provide high $C_{11}^+$ hydrocarbon selectivities to maximize the value of the hydrocarbons produced and thus the process economics.

SUMMARY OF THE INVENTION

This invention provides a process and catalyst for producing hydrocarbons, and a method for preparing the catalyst. The process comprises contacting a feed stream comprising hydrogen and carbon monoxide with a catalyst in a reaction zone maintained at conversion-promoting conditions effective to produce an effluent stream comprising hydrocarbons.

In accordance with this invention, the catalyst used in the process comprises boron and a Fischer-Tropsch metal. The Fischer-Tropsch metal may include cobalt. Further, the Fischer-Tropsch metal additionally includes ruthenium or platinum.

This invention also includes a method for the preparation of a supported Fischer-Tropsch catalyst comprising supporting boron and cobalt and optionally ruthenium or platinum on a support material selected from the group including silica, titania, titania/alumina, zirconia, alumina, aluminum fluoride, and fluorided alumina.

This invention also provides a process for producing hydrocarbons, comprising contacting a feed stream comprising hydrogen and carbon monoxide with a supported catalyst in a reaction zone maintained at conversion-promoting conditions effective to produce an effluent stream comprising hydrocarbons. In accordance with this invention, the catalyst used in the process comprises boron and cobalt and optionally ruthenium or platinum, and one or more support materials selected from the group including silica, titania, titania/alumina, zirconia, alumina, aluminum fluoride, and fluorided aluminas.

DETAILED DESCRIPTION OF THE PREFERRED EMBODIMENTS

The present catalyst contains a catalytically effective amount of a Fischer-Tropsch metal. The amount of metal present in the catalyst may vary widely. Typically, when the catalyst includes a support, the catalyst comprises from about 1 to 50% by weight (as the metal) of the total supported metal per total weight of catalytic metal and support, preferably from about 1 to 35% by weight, and more preferably from about 1 to 30% by weight. A Fischer-Tropsch metal may include an element selected from among a Group 8 element (e.g. Fe, Ru, and Os), a Group 9 element (e.g. Co, Rh, and Ir), a Group 10 element (e.g. Ni, Pd, and Pt), and combinations thereof. Preferably, the Fischer-Tropsch metal includes cobalt. More preferably, the Fischer-Tropsch metal further includes ruthenium or platinum. Ruthenium is preferably added to the catalyst in a concentration sufficient to provide a weight ratio of elemental ruthenium: elemental cobalt of from about 0.00005:1 to about 0.25:1, preferably from about 0.0005:1 to about 0.05:1, most preferably from about 0.0005:1 to 0.01:1 (dry basis). Platinum is preferably added to the catalyst in a concentration sufficient to provide a weight ratio of elemental platinum: elemental cobalt of from about 0.00001:1 to about 0.1:1, preferably from about 0.00005:1 to about 0.05:1, most preferably from about 0.0001:1 to 0.001:1 (dry basis).

We have found that higher selectivity and productivity catalysts are produced when boron is added to the catalyst. This is quite surprising because boron is typically considered to be a Fischer-Tropsch catalyst poisons. Productivites in batch testing can equal or exceed 500 g/hr/kg-cat. Further, the productivity increase with respect to the corresponding unpromoted catalyst can equal or exceed 20%. Likewise, the CO selectivity increase, and the methane selectivity decrease with respect to the corresponding unpromoted catalyst can each equal or exceed 20%. Additionally, and even more surprisingly, the catalysts of the present invention exhibit both improved conversion and improved stability, with long lifetime, relative to prior art Fischer-Tropsch catalysts. The amount of promoter is added to the catalyst in a concentration sufficient to provide a weight ratio of elemental promoter: elemental catalytic metal of from about 0.00005:1 to about 0.5:1, preferably, from about 0.0005:1 to about 0.01:1 (dry basis).

The active catalyst components used in this invention may be carried or supported on a support. Suitable supports include silica, titania, titania/alumina, zirconia, alumina, aluminum fluoride, and fluorided alumina, silica, titania, titania/alumina, silica/alumina, and the like, preferably alumina. Aluminum fluoride supports are defined as at least one aluminum fluoride (e.g., alpha-$AlF_3$, beta-$AlF_3$, delta-$AlF_3$, eta-$AlF_3$, gamma-$AlF_3$, kappa-$AlF_3$ and/or theta-$AlF_3$). Fluorided alumina is defined as a composition comprising aluminum, oxygen, and fluorine. The fluoride content of the fluorided alumina can vary over a wide range, from about 0.001% to about 67.8% by weight. A preferred fluorided alumina contains from 0.001% to about 10% by weight fluorine. The remainder of the fluorided alumina component will include aluminum and oxygen. The composition may also contain a minor amount (compared to aluminum) of silicon, titanium, phosphorus, zirconium and/or magnesium.

The support material comprising fluorided aluminas and/or an aluminum fluoride may be prepared by a variety of methods. For example, U.S. Pat. Nos. 4,275,046 and 4,902,838 and 5,243,106 disclose the preparation of fluorided alumina by the reaction of alumina with a vaporizable fluorine-containing fluorinating compound. Suitable fluorinating compounds include HF, $CCl_3F$, $CCl_2F_2$, $CHClF_2$, $CH_3CHF_2$, $CCl_2FCClF_2$ and $CHF_3$. U.S. Pat. No. 5,243,106 discloses the preparation of a high purity $AlF_3$ from aluminum sec-butoxide and HF.

Phases of aluminum fluoride such as eta, beta, theta and kappa can be prepared as described in U.S. Pat. Nos. 5,393,509, 5,417,954, and 5,460,795.

Aluminas that have been treated with fluosilicic acid ($H_2SiF_6$) such as those described in European Patent Application No. EP 497,436 can also be used as a support. The disclosed support comprises from about 0.5 to about 10 weight percent of fluorine, from 0.5 to about 5 weight percent of silica and from about 85 to about 99 weight percent of alumina.

It will be understood that alternative supports are contemplated. A support may be selected according to desirable structural properties. Further a support may include any suitable composition.

Metals can be supported on aluminum fluoride or on fluorided alumina in a variety of ways. For example, U.S. Pat. No. 4,766,260 discloses the preparation of metals such as cobalt on a fluorided alumina support using impregnation techniques to support the metal. U.S. Pat. No. 5,559,069 discloses the preparation of a multiphase catalyst composition comprising various metal fluorides including cobalt fluoride homogeneously dispersed with aluminum fluoride. PCT Int. Publ. No. 97/19751 discloses the preparation of multiphase catalyst compositions comprising metallic ruthenium homogeneously dispersed with various metal fluorides including aluminum fluoride.

The catalysts of the preferred embodiments of the present invention may be prepared by any of the methods known to those skilled in the art. By way of illustration and not limitation, methods for preparing supported catalysts include impregnating the catalytically active compounds or precursors onto a support, extruding one or more catalytically active compounds or precursors together with support material to prepare catalyst extrudates, and/or precipitating the catalytically active compounds or precursors onto a support. Accordingly, a supported catalysts according to a preferred embodiment of the present invention may be used in the form of powders, particles, pellets, monoliths, honeycombs, packed beds, foams, and aerogels.

The most preferred method of preparation may vary among those skilled in the art, depending for example on the desired catalyst particle size. Those skilled in the art are able to select the most suitable method for a given set of requirements.

One method of preparing a supported metal catalyst is by incipient wetness impregnation of the support with an aqueous solution of a soluble metal salt such as nitrate, acetate, acetylacetonate or the like. Another method of preparing a supported metal catalyst is by a melt impregnation technique, which involves preparing the supported metal catalyst from a molten metal salt. One preferred method is to impregnate the support with a molten metal nitrate (e.g., $Co(NO_3)_2 \cdot 6H_2O$). Alternatively, the support can be impregnated with a solution of zero valent metal precursor. One preferred method is to impregnate the support with a solution of zero valent cobalt such as $Co_2(CO)_8$, $Co_4(CO)_{12}$ or the like in a suitable organic solvent (e.g., toluene). Suitable ruthenium compounds are the common water soluble ones, e.g., $Ru(NH_3)_6Cl_3$ and Ru(III)nitrosylnitrate, and the common organic solvent, e.g. $CH_3CN$, soluble ones, e.g. Ru(II) 2,4-pentanedionate. Suitable platinum compounds include platinum(II)acetylacetonate. Suitable boron compounds are the common water soluble ones, e.g. boria ($B_2O_3$).

The most preferred sequence of addition of elements to a support may vary among those skilled in the art. For example, it is contemplated that the Fischer-Tropsch metal and boron may be added to a support in the same mixture. Alternatively, the Fischer-Tropsch metal and the boron may be added in separate steps. Further, each element may be added in any one or more of the steps of a multiple impregnation. Still further, a supported catalyst according to a preferred embodiment of the present invention may include co-dispersed Fischer-Tropsch metal and boron. Alternatively, a supported catalyst according to a preferred embodiment of the present invention may include a layer containing a Fischer-Tropsch metal and a layer containing boron. This is particularly surprising as boron has been considered to be act as a Fischer-Tropsch poison by covering the Fischer-Tropsch metal.

It will be understood that the promoter is preferably added as a component of the materials loaded on the support, and is thus preferably distinct from a modifier of the support itself.

The impregnated support is dried and reduced with hydrogen or a hydrogen containing gas. The hydrogen reduction step may not be necessary if the catalyst is prepared with zero valent cobalt. In another preferred method, the impregnated support is dried, oxidized with air or oxygen and reduced in the presence of hydrogen.

Typically, at least a portion of the metal(s) of the catalytic metal component (a) of the catalysts of the present invention is present in a reduced state (i.e., in the metallic state). Therefore, it is normally advantageous to activate the catalyst prior to use by a reduction treatment, in the presence of hydrogen at an elevated temperature. Typically, the catalyst is treated with hydrogen at a temperature in the range of from about 75° C. to about 500° C., for about 0.5 to about 24 hours at a pressure of about 1 to about 75 atm. Pure hydrogen may be used in the reduction treatment, as may a mixture of hydrogen and an inert gas such as nitrogen, or a mixture of hydrogen and other gases as are known in the art, such as carbon monoxide and carbon dioxide. Reduction with pure hydrogen and reduction with a mixture of hydrogen and carbon monoxide are preferred. The amount of hydrogen may range from about 1% to about 100% by volume.

The catalysts of the preferred embodiments of the present invention are preferably used in a catalytic process for production of hydrocarbons, most preferably the Fischer-Tropsch process. The feed gases charged to the process of the preferred embodiment of the present invention comprise hydrogen, or a hydrogen source, and carbon monoxide. $H_2$/CO mixtures suitable as a feedstock for conversion to hydrocarbons according to the process of this invention can be obtained from light hydrocarbons such as methane by means of steam reforming, partial oxidation, or other processes known in the art. Preferably the hydrogen is provided by free hydrogen, although some Fischer-Tropsch catalysts have sufficient water gas shift activity to convert some water to hydrogen for use in the Fischer-Tropsch process. It is preferred that the molar ratio of hydrogen to carbon monoxide in the feed be greater than 0.5:1 (e.g., from about 0.67 to 2.5). Preferably, the feed gas stream contains hydrogen and carbon monoxide in a molar ratio of about 2:1. The feed gas may also contain carbon dioxide. The feed gas stream should contain a low concentration of compounds or elements that have a deleterious effect on the catalyst, such as poisons. For example, the feed gas may need to be pretreated to ensure that it contains low concentrations of sulfur or nitrogen compounds such as hydrogen sulfide, ammonia and carbonyl sulfides.

The feed gas is contacted with the catalyst in a reaction zone. Mechanical arrangements of conventional design may be employed as the reaction zone including, for example, fixed bed, fluidized bed, slurry phase, slurry bubble column, reactive distillation column, or ebullating bed reactors, among others, may be used. Accordingly, the size and physical form of the catalyst particles may vary depending on the reactor in which they are to be used.

The Fischer-Tropsch process is typically run in a continuous mode. In this mode, the gas hourly space velocity through the reaction zone typically may range from about 100 volumes/hour/volume catalyst (v/hr/v) to about 10,000 v/hr/v, preferably from about 1000 v/hr/v to about 8,000 v/hr/v. The reaction zone temperature is typically in the range from about 160° C. to about 300° C. Preferably, the reaction zone is operated at conversion promoting conditions at temperatures from about 190° C. to about 260° C. The reaction zone pressure is typically in the range of about 80 psig (653 kPa) to about 1000 psig (6994 kPa), preferably, from 80 psig (653 kPa) to about 600 psig (4237 kPa), and still more preferably, from about 140 psig (1066 kPa) to about 450 psig (2858 kPa).

The products resulting from the process will have a great range of molecular weights. Typically, the carbon number range of the product hydrocarbons will start at methane and continue to the limits observable by modern analysis, about 50 to 100 carbons per molecule. The process is particularly useful for making hydrocarbons having five or more carbon atoms especially when the above-referenced preferred space velocity, temperature and pressure ranges are employed.

The wide range of hydrocarbons produced in the reaction zone will typically afford liquid phase products at the reaction zone operating conditions. Therefore the effluent stream of the reaction zone will often be a mixed phase stream including liquid and vapor phase products. The effluent stream of the reaction zone may be cooled to effect the condensation of additional amounts of hydrocarbons and passed into a vapor-liquid separation zone separating the liquid and vapor phase products. The vapor phase material may be passed into a second stage of cooling for recovery of additional hydrocarbons. The liquid phase material from the initial vapor-liquid separation zone together with any liquid from a subsequent separation zone may be fed into a fractionation column. Typically, a stripping column is employed first to remove light hydrocarbons such as propane and butane. The remaining hydrocarbons may be passed into a fractionation column where they are separated by boiling point range into products such as naphtha, kerosene and fuel oils. Hydrocarbons recovered from the reaction zone and having a boiling point above that of the desired products may be passed into conventional processing equipment such as a hydrocracking zone in order to reduce their molecular weight. The gas phase recovered from the reactor zone effluent stream after hydrocarbon recovery may be partially recycled if it contains a sufficient quantity of hydrogen and/or carbon monoxide.

Without further elaboration, it is believed that one skilled in the art can, using the description herein, utilize the present invention to its fullest extent. The following embodiments are to be construed as illustrative, and not as constraining the scope of the present invention in any way whatsoever. For example, it will be understood that while some continuous testing is described, a process for producing hydrocarbons may alternatively be operated in batch mode.

EXAMPLES

Catalyst Reduction

Each of the catalyst samples used in continuous fixed bed testing was treated with hydrogen prior to use in the Fischer-Tropsch reaction. The catalyst sample was placed in a small quartz crucible in a chamber and purged with 500 sccm ($8.3 \times 10^{-6}$ m$^3$/s) nitrogen at room temperature for 15 minutes. The sample was then heated under 100 sccm ($1.7 \times 10^{-6}$ m$^3$/s) hydrogen at 1° C./minute to 100° C. and held at 100° C. for one hour. The catalysts were then heated at 1° C./minute to 400° C. and held at 400° C. for four hours under 100 sccm ($1.7 \times 10^{-6}$ m$^3$/s) hydrogen. The samples were cooled in hydrogen and purged with nitrogen before use.

Each of the catalyst samples used in continuous slurry bed testing underwent a high-temperature activation step prior to reaction using the following procedure: A known weight of the catalyst was loaded in a 1 in. OD stainless steel tube. The tube was heated to 120° C. under nitrogen flow (1000 cc/min & 40 psig) at a rate of 1.5° C./min. The tube was maintained at 120° C. under these conditions for two hours for drying of the catalyst. At the end of the drying period, the flow was switched from nitrogen to hydrogen. The tube was heated under hydrogen flow (1000 cc/min and 40 psig) at a rate of 1.4° C./min to a temperature of about 400° C. The tube was maintained at about 400° C. under these conditions for sixteen hours for catalyst reduction. At the end of the reduction period, the flow was switched back to nitrogen and the tube cooled to room temperature.

Catalyst Preparation

EXAMPLE A

This example is a comparative example of a corresponding catalyst without a boron promoter. Alumina (Engelhard 712A-5-1584-1, 4.0000 g) was slurried into a solution of molten $Co(NO_3)_2 \cdot 6H_2O$ (4.9383 g). The catalyst precursor was dried at 80° C. The resulting catalyst precursor was removed from the oven and exposed to air to absorb moisture. The catalyst precursor was then dried again at 80° C., followed by heating at 0.5° C. per minute to 350° C., and maintaining this temperature for 18 minutes. The r catalyst precursor was then heated at 0.5° C. per minute to 450° C., and reduced in hydrogen flow at 450° C. for 6 hours. The catalyst had a nominal composition of 20%Co/Al$_2$O$_3$.

EXAMPLE B

This example is a comparative example of a corresponding catalyst containing ruthenium and without a boron promoter. The catalyst was prepared by an aqueous impregnation of cobalt done in three steps on a commercially available gamma-alumina support. Ruthenium was co-impregnated during the last step of cobalt impregnation. The catalyst was dried at 120° C. and calcined at 300° C. This catalyst had a nominal composition of 20%Co/0.1% Ru/Al$_2$O$_3$.

EXAMPLE 1

$B_2O_3$ (0.08056 g) was dissolved in a small amount of water, added to molten $Co(NO_3)_2 \cdot 6H_2O$ (4.9383 g) and mixed well. Alumina (Chimet, 3.975 g) was slurried into this solution. The slurry was treated according to the procedure described above. The catalyst had a nominal composition of 20%Co/0.5%B/Al$_2$O$_3$.

EXAMPLE 2

The same materials and procedure were used as in Example B, except that boron was co-impregnated with ruthenium, to prepare a boron promoted catalyst. In particular, ruthenium and boron were co-impregnated during the last step of cobalt impregnation. This catalyst had a nominal composition of 20%Co/0.1% Ru/0.5%B/Al$_2$O$_3$.

EXAMPLE 3

The catalyst was made by impregnating alumina (from Condea as Puralox SCCa 5/150). The alumina was impregnated with an aqueous solution of cobalt nitrate ($Co(NO)_3 6H_2O$, platinum(II) acetylacetonate, and boric acid using an appropriate quantity for incipient wetness. The catalyst precursor was then dried in air at 120° C. for 2 hours and calcined in air at 240° C. for 4 hours. This catalyst had a nominal composition of 20%Co/0.02%Pt/0.5%B/Al$_2$O$_3$.

EXAMPLE 4

The same materials and procedure were used as in Example 3, except that platinum(II) acetylacetonate was used in a greater amount. This catalyst had a nominal composition of 20%Co/0.05%Pt/0.5%B/Al$_2$O$_3$.

General Procedure for Continuous Fixed Bed Tests

The catalyst testing fixed bed unit was composed of a syngas feed system, a tubular reactor, which had a set of wax and cold traps, back pressure regulators, and three gas chromatographs (one on-line and two off-line).

The carbon monoxide was purified before being fed to the reactor over a 22% lead oxide on alumina catalyst placed in a trap to remove any iron carbonyls present. The individual gases or mixtures of the gases were mixed in a 300 mL vessel filled with glass beads before entering the supply manifold feeding the reactor.

The reactor was made of ⅜ in. (0.95 cm) O.D. by ¼ in. (0.63 cm) I.D. stainless steel tubing. The length of the reactor tubing was 14 in. (35.6 cm). The actual length of the catalyst bed was 10 in. (25.4 cm) with 2 in. (5.1 cm) of 25/30 mesh (0.71/0.59 mm) glass beads and glass wool at the inlet and outlet of the reactor.

The wax and cold traps were made of 75 mL pressure cylinders. The wax traps were set at 140° C. while the cold traps were set at 0° C. The reactor had two wax traps in parallel followed by two cold traps in parallel. At any given time products from the reactor flowed through one wax and one cold trap in series. Following a material balance period, the hot and cold traps used were switched to the other set in parallel, if needed. The wax traps collected a heavy hydrocarbon product distribution (usually between C$_6$ and above) while the cold traps collected a lighter hydrocarbon product distribution (usually between C$_3$ and C$_{20}$). Water, a major product of the Fischer-Tropsch process was collected in both the traps.

General Analytical Procedure

The uncondensed gaseous products from the reactors were analyzed using a common on-line HP Refinery Gas Analyzer. The Refinery Gas Analyzer was equipped with two thermal conductivity detectors and measured the concentrations of CO, H$_2$, N$_2$, CO$_2$, CH$_4$, C$_2$ to C$_5$ alkenes/alkanes/isomers and water in the uncondensed reactor products. The products from each of the hot and cold traps were separated into an aqueous and an organic phase. The organic phase from the hot trap was usually solid at room temperature. A portion of this solid product was dissolved in carbon disulfide before analysis. The organic phase from the cold trap was usually liquid at room temperature and was analyzed as obtained. The aqueous phase from the two traps was combined and analyzed for alcohols and other oxygenates. Two off-line gas chromatographs equipped with flame ionization detectors were used for the analysis of the organic and aqueous phases collected from the wax and cold traps.

Catalyst Testing Procedure

Catalyst (3 g) to be tested was mixed with 4 grams of 25/30 mesh (0.71/0.59 mm) and 4 grams of 2 mm glass beads. The 14 in. (35.6 cm) tubular reactor was first loaded with 25/30 mesh (0.71/0.59 mm) glass beads so as to occupy 2 in. (5.1 cm) length of the reactor. The catalyst/glass bead mixture was then loaded and occupied 10 in. (25.4 cm) of the reactor length. The remaining 2 in. (5.1 cm) of reactor length was once again filled with 25/30 mesh (0.71/0.59 mm) glass beads. Both ends of the reactor were plugged with glass wool.

Catalyst activation was subsequently carried out using the following procedure. The reactor was heated to 120° C. under nitrogen flow (100 cc/min and 40 psig (377 kPa)) at a rate of 1.5° C./min. The reactor was maintained at 120° C. under these conditions for two hours for drying of the catalyst. At the end of the drying period, the flow was switched from nitrogen to hydrogen. The reactor was heated under hydrogen flow (100 cc/min and 40 psig (377 kPa)) at a rate of 1.4° C./min. to 350° C. The reactor was maintained at 350° C. under these conditions for sixteen hours for catalyst reduction. At the end of the reduction period, the flow was switched back to nitrogen and the reactor cooled to reaction temperature (usually 220° C.).

The reactor was pressurized to the desired reaction pressure and cooled to the desired reaction temperature. Syngas, with a 2:1 H$_2$/CO ratio was then fed to the reactor when reaction conditions were reached.

The first material balance period started at about four hours after the start of the reaction. A material balance period lasted for between 16 to 24 hours. During the material balance period, data was collected for feed syngas and exit uncondensed gas flow rates and compositions, weights and compositions of aqueous and organic phases collected in the wax and cold traps, and reaction conditions such as temperature and pressure. The information collected was then analyzed to get a total as well as individual carbon, hydrogen and oxygen material balances. From this information, CO Conversion (%), Selectivity/Alpha plot for all (C$_1$ to C$_{40}$) of the hydrocarbon products, C$_{5+}$ Productivity (g/hr/kg cat), weight percent CH$_4$ in hydrocarbon products (%) and other desired reactor outputs were calculated.

The results obtained from the continuous-flow Fischer-Tropsch catalyst testing unit are shown in Tables 1–3.

Each of Tables 1–2 lists the hours on stream, relative CO Conversion (%), relative, weight percent methane in the total hydrocarbon product (%) and relative C$_{5+}$ Productivity (%) for catalyst A and for catalyst 1, respectively. The relative amounts (i.e. stability) are with respect to the initial material balance period listed in each Table, at 49 and 48 hours, respectively. That is, the relative value of each variable for each material balance period is computed as (Value at X hours—Value at 48–49 hours)/(Value at 48–49 hours), where X is the hours on stream for any subsequent material balance period. The α value from the Anderson-Shultz-Flory plot of the hydrocarbon product distribution was 0.89 and 0.88 for catalyst A and catalyst 1, respectively.

The results shown in Table 3 demonstrate improved stability of catalyst 1 with respect to catalyst A. Each % improvement, for material balance period listed, was computed by the procedure (Value in Table 2—Value in Table 1)/(Value in Table 1).

Table 4 lists the hours on stream and the CO Conversion and C$_{5+}$ Productivity for the catalyst of Example 1 as compared to that the Example A for the same material balance period. That is, each % improvement, for each material balance period, was computed by the procedure (Value for Catalyst 1—Value for Catalyst A)/(Value for Catalyst A), where Value is the value of CO Conversion or C$_{5+}$ Productivity.

The temperature was 220° C., the pressure was between 340 psig (2445 kPa) to 362 (2597 kPa) and the space velocity was 2 NL/hour/g.cat. for all the examples in Tables 1–4.

TABLE 1

Catalyst A. 20% Co/Al$_2$O$_3$

| | Stability | | |
|---|---|---|---|
| Age (hours) | CO Conv. (%) | C$_1$ Selec. (%) | C$_{5+}$ Prod. (%) |
| 49 | 100 | 100 | 100 |
| 73 | 98 | 106 | 94 |
| 97 | 95 | 94 | 106 |
| 147 | 89 | 106 | 83 |
| 170 | 89 | 106 | 83 |
| 193 | 86 | 106 | 78 |

TABLE 2

Catalyst 1. 20% Co/0.5% B/Al$_2$O$_3$

| | Stability | | |
|---|---|---|---|
| Age (hours) | CO Conv. (%) | C$_1$ Selec. (%) | C$_{5+}$ Prod. (%) |
| 48 | 100 | 100 | 100 |
| 74 | 91 | 137 | 80 |
| 98 | 94 | 126 | 90 |
| 121 | 100 | 116 | 90 |
| 145 | 96 | 126 | 85 |

TABLE 3

Improved stability of boron-promoted catalyst

| Age (hours) | CO Conv. (%) | C$_{5+}$ Prod. (%) |
|---|---|---|
| 145–147 | 12 | 9 |

TABLE 4

Improved performance of boron-promoted catalyst

| Age (hours) | CO Conv. | C$_{5+}$ Prod. |
|---|---|---|
| 48–49 | 11 | 11 |
| 145–147 | 20 | 6 |

General Procedure for Continuous Slurry Bed Testing

The slurry continuous flow stirred tank reactor (CSTR) catalyst testing unit included a gas feed system, a slurry stirred tank reactor, wax and cold traps, back pressure regulator, and three gas chromatographs (one on-line and two off-line).

The gas supply system involved multiple pressurized gas cylinders, pressure regulators and individual mass flow controllers to supply carbon monoxide, hydrogen and/or nitrogen to the reactor. The carbon monoxide was purified before being fed to the reactors over a 22% lead oxide on alumina catalyst placed in a trap to remove any iron carbonyls present.

The reactor was a 1 liter stainless-steel stirred autoclave equipped with two stirrers on a single shaft. The bottom stirrer was a gas-entrainment impeller, while the top stirrer was a pitched turbine impeller. A thermocouple inside a well in the reactor measured the slurry temperature in the reactor. The reactor had a furnace for heating. The temperature of the reactor was controlled by a thermocouple measuring the furnace temperature. Gas was feed to the reactor at the bottom of the reactor, just below the bottom stirrer, through a ⅛ in. tube. Unconverted reactants and reactor products exited the reactor at the top through an in-line sintered metal filter.

The wax and cold traps were made of 500 cc pressure cylinders. The wax trap was set at 100° C. while the cold trap was set at 0° C. The wax trap collected a heavy hydrocarbon product distribution usually C$_6$+ while the cold traps collect a lighter hydrocarbon product distribution usually between C$_3$ and C$_{20}$. Water, a major byproduct of the Fischer-Tropsch reaction, was collected in both the traps.

A back pressure regulator for each reactor was placed downstream of the wax and cold traps. The back pressure regulator relieved the pressure from reaction pressure to ambient. An electronic soap bubble flow meter, placed downstream of the back pressure regulator, was used to periodically measure the flow rate of the uncondensed gas products.

General Analytical Procedure

The uncondensed gaseous products from the reactors were analyzed using a HP MicroGC gas chromatograph. It included four measurement channels and four thermal conductivity detectors. The chromatograph measured the concentrations of CO, H$_2$, N$_2$, CO$_2$, CH$_4$, C$_2$ to C$_9$ alkenes/alkanes/isomers in the uncondensed reactor products.

The products from the hot and cold traps were separated into an aqueous and an organic phase. The organic phase from the hot trap was usually solid at room temperature. A portion of this solid product was dissolved in carbon disulfide before analysis. The organic phase from the cold trap was usually liquid at room temperature and was analyzed as obtained. The aqueous phase from the two traps was combined and analyzed for alcohols and other oxygenates.

Two off-line gas chromatographs were used for the analysis of the organic and aqueous phases collected from the wax and cold traps. The chromatograph for the organic phase had a flame ionization detector and a DB-1 column for separation. This column separated the organic phase into individual hydrocarbon compounds in the range C$_3$ to C$_{45}$. Hydrocarbons containing more than 45 carbon atoms were below the limit of detection for this chromatograph. The chromatograph for the aqueous phase had a thermal conductivity detector and a packed Porpak-Q column for separation.

Catalyst Testing Procedure 300 grams of a heavy hydrocarbon wax with an average molecular weight of 1200 was loaded in the CSTR reactor. The reactor was heated to 120° C. to melt the solid start-up wax, sealed, the stirrer was started at 1000 rpm and a nitrogen flow rate of 1000 cc/min was started. The tube containing the activated catalyst was attached to the reactor head and the catalyst was transferred to the reactor under a nitrogen atmosphere.

The catalyst was pre-treated in slurry in the CSTR reactor before reaction. The gas flow was switched to hydrogen and the reactor was heated to 280° C. at a rate of 2° C./min. The reactor was maintained at this temperature for 16 hours. At the end of this step the reactor was cooled to the desired reaction temperature (usually 225° C.) and pressurized to the desired reaction pressure (usually 350 psig). Syngas, with a 2:1 H$_2$/CO ratio was then fed to the reactors when reaction conditions had been reached.

A material balance period lasted for between 16 to 24 hours. Total run times on these catalysts were about 280 to 335 hours. During the material balance period, data was collected for feed syngas and exit uncondensed gas flow rates and compositions, weights and compositions of aqueous and organic phases collected in the wax and cold traps, and reaction conditions such as temperature and pressure. The information collected is then analyzed to get a total as well as individual carbon, hydrogen and oxygen material balances. Thus complete information is obtained regarding the type and quantities of reactor inputs (CO and $H_2$) as well as the type and quantities of reactor outputs (hydrocarbon products, water, oxygenates & unconverted reactants). From this information, it was possible to obtain CO Conversion (%), Selectivity for each ($C_1$ to $C_{40}$) of the hydrocarbon products, $C_5+$ Productivity (g/hr/kgcat), weight percent $CH_4$ in hydrocarbon products (%), α, and the like.

The material balances were obtained for the catalysts of Examples B and 2 at the following reaction conditions: 225° C., 350 psig, syngas space velocity of 4 Nl/hr/gcat and $H_2$/CO ratio of 2. Results for relative values in % for CO conversion, methane selectivity, $CO_2$ selectivity, and $C_{5+}$ productivity are listed in Tables 5 and 6 for the catalysts of Examples B and 2, respectively. The relative value (i.e. stability) of each variable for each material balance period is computed as (Value at X hours—Value at 23 hours)/(Value at 23 hours), where X is the hours on stream for any subsequent material balance period. The a value from the Anderson-Shultz-Flory plot of the hydrocarbon product distribution was 0.86 and 0.87 for catalyst B and catalyst 2, respectively.

TABLE 5

Catalyst B. 20% Co/0.1% Ru/$Al_2O_3$

Stability

| Age (hours) | CO Conv. (%) | $C_1$ Selec. (%) | $CO_2$ Selec. (%) | $C_{5+}$ Prod. (%) |
| --- | --- | --- | --- | --- |
| 23 | 100 | 100 | 100 | 100 |
| 94 | 89 | 112 | 40 | 91 |
| 118 | 89 | 123 | 36 | 88 |
| 142 | 86 | 113 | 40 | 86 |
| 166 | 89 | 113 | 34 | 91 |
| 190 | 86 | 118 | 36 | 86 |
| 262 | 79 | 132 | 29 | 77 |
| 286 | 73 | 148 | 28 | 70 |
| 311 | 77 | 130 | 24 | 77 |
| 335 | 76 | 132 | 24 | 74 |

TABLE 6

Catalyst 2. 20% Co/0.1% Ru/0.5% B/$Al_2O_3$

Stability

| Age (hours) | CO Conv. (%) | $C_1$ Selec. (%) | $CO_2$ Selec. (%) | $C_{5+}$ Prod. (%) |
| --- | --- | --- | --- | --- |
| 23 | 100 | 100 | 100 | 100 |
| 94 | 94 | 110 | 46 | 96 |
| 118 | 97 | 108 | 40 | 98 |
| 142 | 97 | 114 | 36 | 98 |
| 166 | 97 | 114 | 36 | 98 |
| 190 | 100 | 138 | 46 | 98 |
| 262 | 91 | 125 | 28 | 91 |
| 286 | 88 | 138 | 32 | 87 |
| 311 | 90 | 127 | 28 | 89 |
| 335 | 86 | 135 | 25 | 84 |

A comparison between Tables 6 and 5 demonstrates the improved stability of a boron-promoted catalyst. Steady-state improvements are given in Table 7.

TABLE 7

Improved stability of boron-promoted catalyst

| Age (hours) | CO Conv. (%) | $C_{5+}$ Prod. (%) |
| --- | --- | --- |
| 335 | 13 | 14 |

A comparison of the absolute amounts of the variables used to generate Tables 4 and 5 shows that both catalysts B and 2 started out at approximately the same activity as signified by the CO conversion. Both catalysts then exhibited a small deactivation period. After about 200 hours, the catalyst activity for both catalysts achieved a steady value of CO conversion. However, Catalyst B (without boron) showed a smaller steady state CO conversion as compared to Catalyst 2 (with boron). Further, the distillate yield (C5+) for Catalyst B was lower than that for Catalyst 2. The methane selectivity was slightly higher for Catalyst B as compared to Catalyst 2 at steady conversion levels.

A preferred Fischer-Tropsch catalyst is one with a high conversion, high C5+ yield and low methane selectivity. Catalyst 2 (with boron) is better than Catalyst B (without boron). Table 8 lists results for productivity increase, CO conversion increase, and methane selectivity decrease for Catalyst 2 (boron promoted) as compared to the corresponding Catalyst B (without boron), as a reference catalyst, that were computed using the results in Tables 4 and 5. An increase (or decrease) in a variable, as given in %, as computed as (Value for Catalyst—Value for Reference Catalyst)/Value for Reference Catalyst (or the magnitude thereof). Table 8 illustrates the superior results of Catalyst 2, as compared to Catalyst B. It is concluded that the addition of boron promotes the activity of Cobalt-Ruthenium catalysts.

TABLE 8

Improved performance of boron-promoted catalyst

| Age (hr) | CO Conversion Increase (%) | $CH_4$ Selectivity Decrease (%) | $C_{5+}$ Productivity Increase (%) |
| --- | --- | --- | --- |
| 23 | 2 | 20 | 4 |
| 94 | 7 | 21 | 11 |
| 118 | 10 | 29 | 18 |
| 142 | 14 | 20 | 17 |
| 166 | 10 | 20 | 13 |
| 190 | 18 | 6 | 20 |
| 262 | 17 | 24 | 24 |
| 287 | 23 | 26 | 30 |
| 311 | 22 | 22 | 21 |
| 335 | 16 | 17 | 19 |

The material balances were obtained for the catalysts of Examples 3 and 4 at the following reaction conditions: 225° C., 350 psig, syngas space velocity of 6 Nl/hr/gcat and $H_2$/CO ratio of 2. Results for relative values of CO conversion, methane selectivity, $CO_2$ selectivity, and $C_{5+}$ productivity are listed in Tables 9 and 10 for the catalysts of Examples 3 and 4, respectively. The relative value (i.e. stability) of each variable for each material balance period is computed as (Variable at X hours—Variable at 20–21 hours)/(Variable at 20–21 hours), where X is the hours on stream for any subsequent material balance period.

TABLE 9

Catalyst 3. 20% Co/0.02% Pt/0.5% B/Al$_2$O$_3$

| | Stability | | | |
|---|---|---|---|---|
| Age (hours) | CO Conv. (%) | C$_1$ Selec. (%) | CO$_2$ Selec. (%) | C$_{5+}$ Prod. (%) |
| 20 | 100 | 100 | 100 | 100 |
| 44 | 102 | 88 | 90 | 105 |
| 116 | 104 | 92 | 95 | 106 |
| 139 | 104 | 89 | 88 | 107 |
| 164 | 102 | 89 | 85 | 104 |
| 188 | 100 | 93 | 82 | 102 |
| 212 | 96 | 97 | 82 | 98 |
| 283 | 93 | 100 | 73 | 92 |

TABLE 10

Catalyst 4. 20% Co/0.05% Pt/0.5% B/Al$_2$O$_3$

| | Stability | | | |
|---|---|---|---|---|
| Age (hours) | CO Conv. (%) | C$_1$ Selec. (%) | CO$_2$ Selec. (%) | C$_{5+}$ Prod. (%) |
| 21 | 100 | 100 | 100 | 100 |
| 44 | 104 | 105 | 76 | 104 |
| 116 | 104 | 109 | 85 | 104 |
| 140 | 108 | 100 | 85 | 108 |
| 164 | 110 | 97 | 85 | 112 |
| 187 | 104 | 103 | 85 | 104 |
| 212 | 102 | 108 | 85 | 100 |
| 283 | 96 | 103 | 58 | 96 |

Tables 9 and 10 show that improved stability (e.g. with respect to catalyst B) of CO conversions, methane and carbon dioxide selectivity and C5+ yields are also obtained for catalysts containing platinum and boron instead of ruthenium and boron.

While a preferred embodiment of the present invention has been shown and described, it will be understood that variations can be made to the preferred embodiment without departing from the scope of, and which are equivalent to, the present invention. For example, the structure and composition of the catalyst can be modified and the process steps can be varied.

The complete disclosures of all patents, patent documents, and publications cited herein are hereby incorporated by reference in their entirety.

The foregoing detailed description and examples have been given for clarity of understanding only. No unnecessary limitations are to be understood therefrom. The invention is not limited to the exact details shown and described, for variations obvious to one skilled in the art will be included within the invention by the claims.

What is claimed is:

1. A process for producing hydrocarbons, comprising contacting a feed stream comprising hydrogen and carbon monoxide with a catalyst in a reaction zone maintained at conversion-promoting conditions effective to produce an effluent stream comprising hydrocarbons; said catalyst comprising a Fischer-Tropsch metal and a promoter comprising boron, wherein the catalyst is made by a method comprising loading the boron to the catalyst by adding boria or boric acid in a concentration sufficient to provide a weight ratio of boron: Fischer-Tropsch metal of from about 0.0005:1 to about 0.025:1.

2. The process of claim 1 wherein the Fischer-Tropsch metal comprises cobalt.

3. The process of claim 2 wherein the Fischer-Tropsch metal further comprises ruthenium.

4. The process of claim 1 wherein the catalyst comprises a support.

5. The process of claim 4 wherein the support comprises alumina.

6. The process of claim 2 wherein the Fischer-Tropsch metal further comprises platinum.

7. A process for producing hydrocarbons, comprising contacting a feed stream comprising hydrogen and carbon monoxide with a catalyst in a reaction zone maintained at conversion-promoting conditions effective to produce an effluent stream comprising hydrocarbons; said catalyst comprising a support, a Fischer-Tropsch metal comprising cobalt; and a promoter comprising boron, wherein the catalyst is made by a method comprising loading the promoter onto the support by the addition of boria or boric acid concurrent with or after loading the Fischer-Tropsch metal onto the support, and wherein the promoter is loaded in a concentration sufficient to provide a weight ratio of the promoter comprising boron: Fischer-Tropsch metal of from about 0.0005:1 to about 0.025:1.

8. The process according to claim 7 wherein the promoter and the Fischer-Tropsch metal are loaded onto the support concurrently.

9. A process for producing hydrocarbons, comprising contacting a feed stream comprising hydrogen and carbon monoxide with a catalyst in a reaction zone maintained at conversion-promoting conditions effective to produce an effluent stream comprising hydrocarbons; said catalyst comprising a support; a Fischer-Tropsch metal comprising cobalt and a Fischer-Tropsch metal comprising platinum; and a promoter comprising boron; wherein the catalyst is made by a method comprising loading the promoter comprising boron onto the support by the addition of boria or boric acid concurrent with or after loading at least one Fischer-Tropsch metal onto the support, and wherein the promoter is loaded in a concentration sufficient to provide a weight ratio of the promoter comprising boron: Fischer-Tropsch metal of from about 0.0005:1 to about 0.025:1.

10. The process according to claim 9 wherein the support comprises alumina; and wherein the promoter and the Fischer-Tropsch metal comprising cobalt are loaded onto the support concurrently.

11. The process according to claim 9 wherein the promoter and the Fischer-Tropsch metal comprising cobalt are loaded onto the support concurrently.

* * * * *